United States Patent Office 3,348,447
Patented Oct. 24, 1967

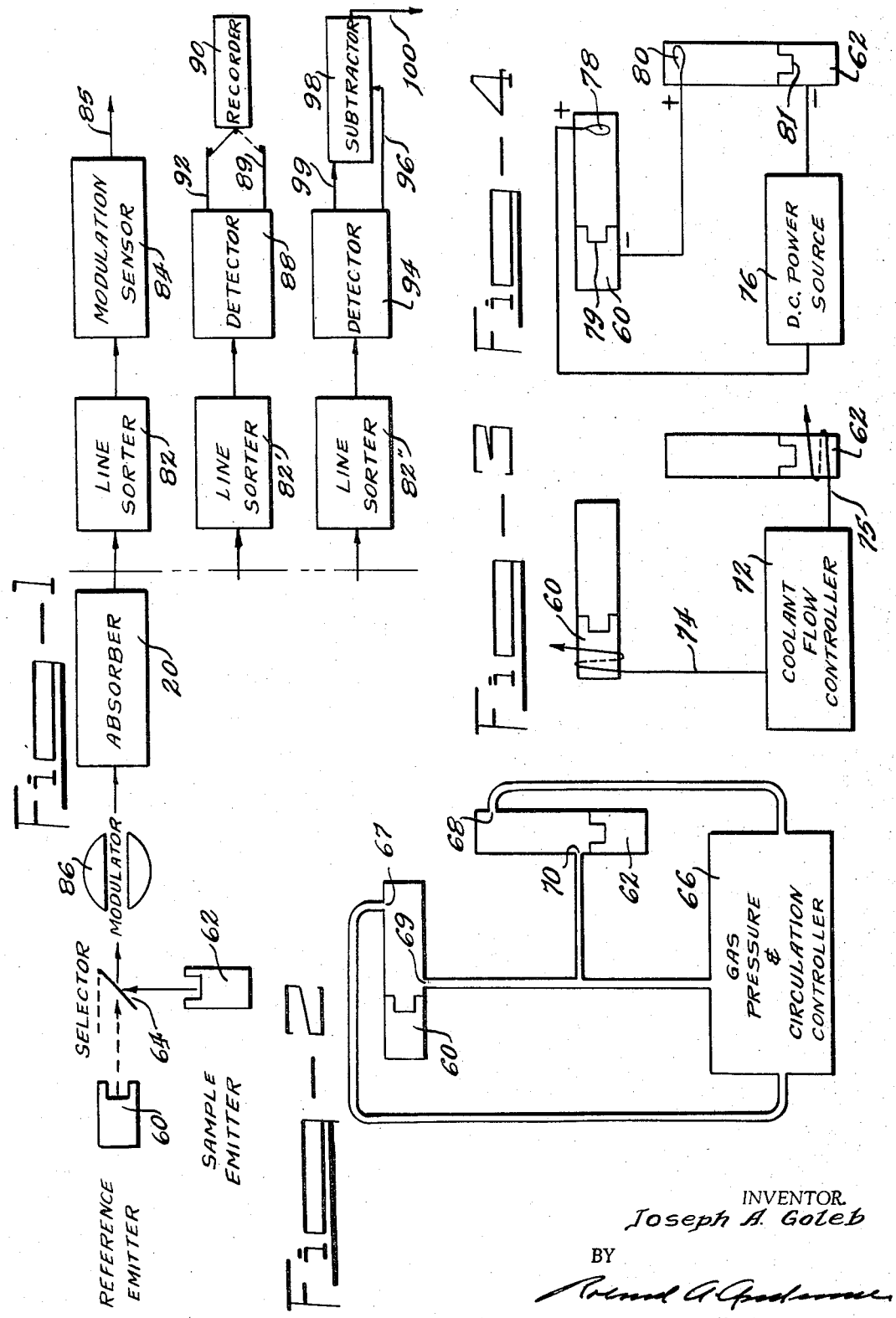

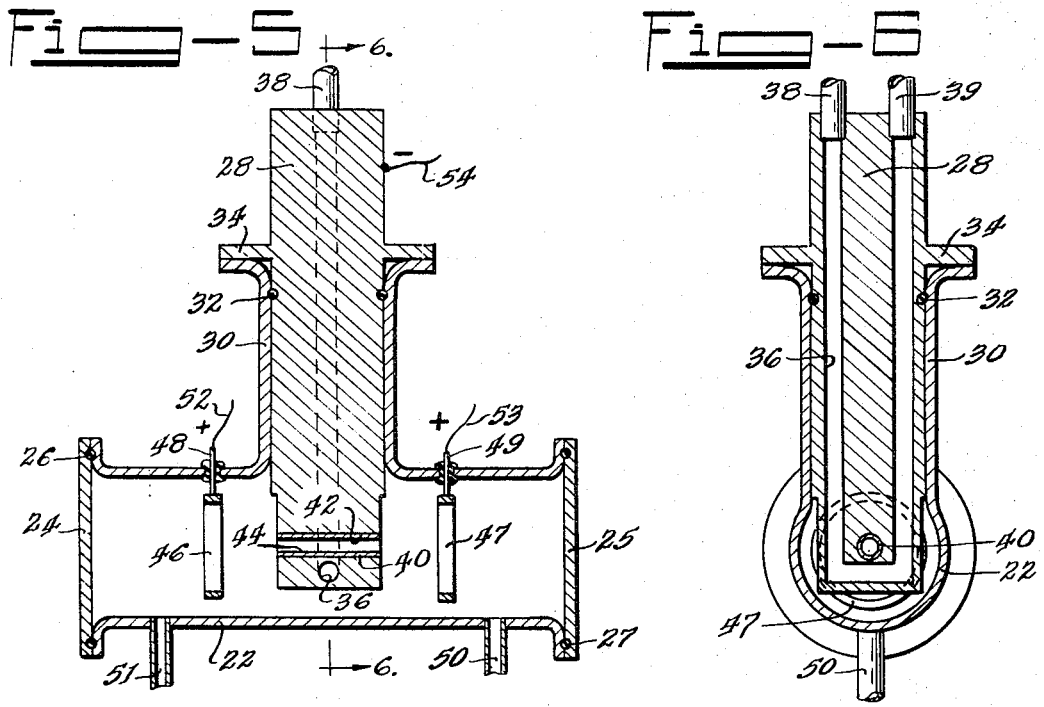
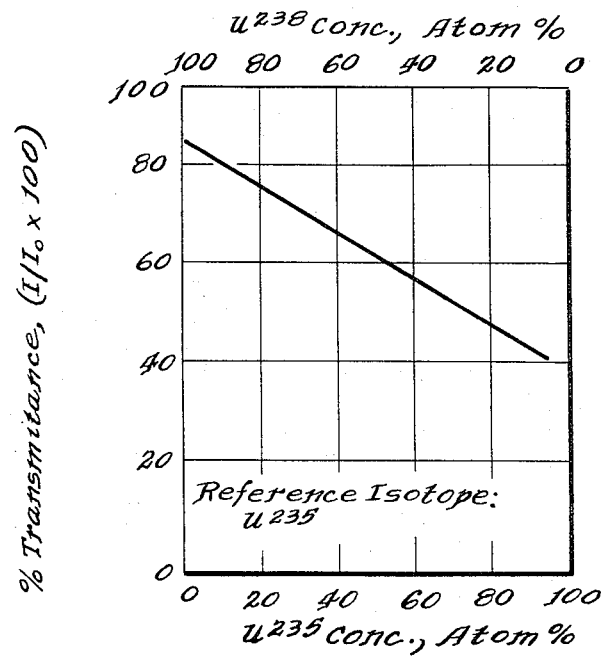
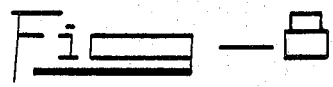

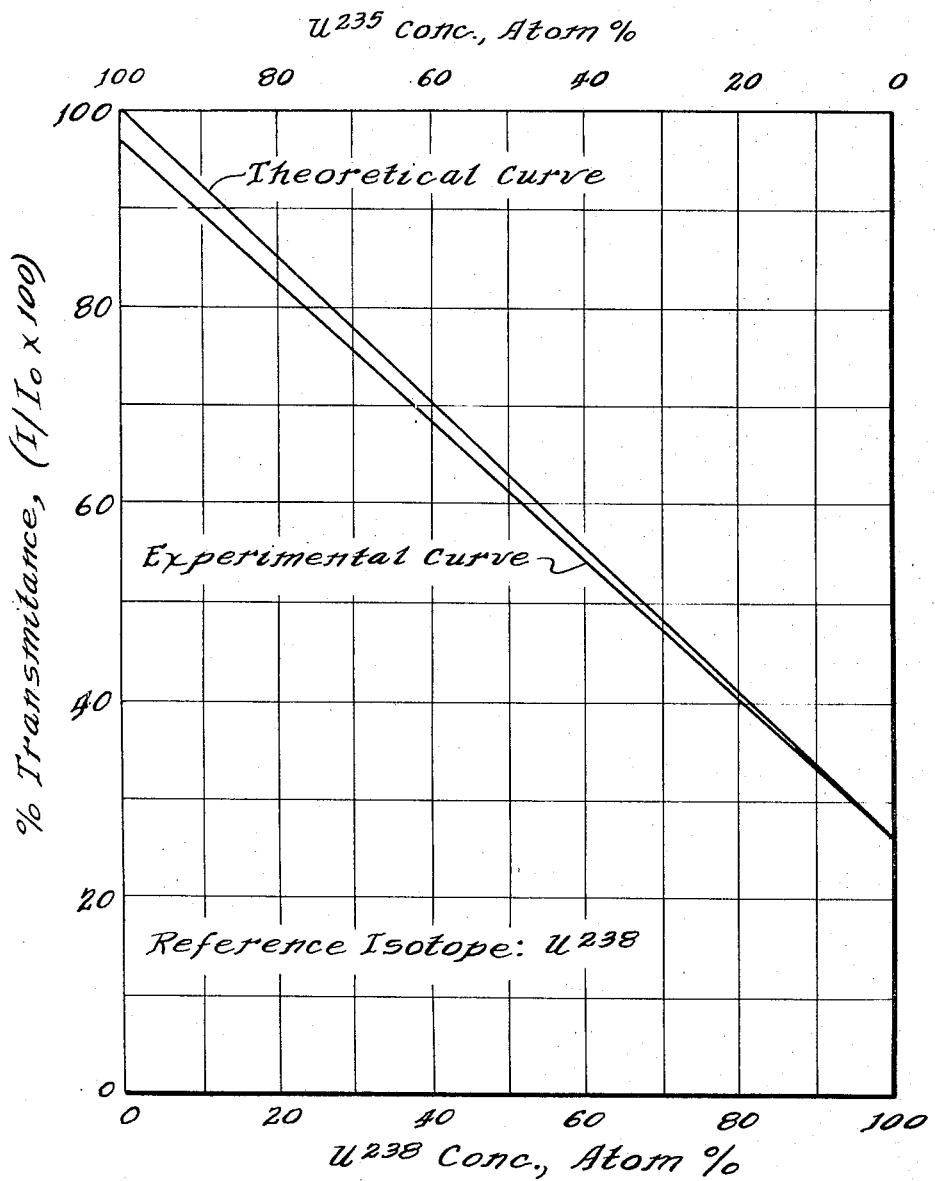

3,348,447
DETERMINATION OF ISOTOPIC
CONCENTRATIONS
Joseph A. Goleb, Naperville, Ill., assignor to the United States of America as represented by the United States Atomic Energy Commission
Filed Oct. 16, 1964, Ser. No. 404,542
6 Claims. (Cl. 88—14)

The invention relates to a novel method and apparatus for determining the concentrations of isotopes, more particularly for determining those of the actinide elements for use in nuclear reactors.

The invention described herein was made in the course of, or under, a contract with the United States Atomic Energy Commission.

Many situations now exist in the nuclear field where isotopic determinations are required. The commonest is probably where the degree of enrichment of uranium fuel has to be established before it is used in a reactor. While the invention is chiefly addressed to this important application, it can be used also in numerous others, including those in which elements other than the actinide elements are involved.

Isotopic concentrations can be determined by known devices such as mass spectrographs and high resolution emission spectrographs, but these are expensive, and must be adjusted and operated by highly trained personnel. Hence, though satisfactory from a strictly scientific point of view, these instruments leave much to be desired for industrial use. For this purpose something is needed which is cheaper, more rugged, and simple enough to be operated by personnel with only limited training. Such a device would contribute significantly to the lowering of fuel processing and reprocessing costs and would help give atomic energy broader commercial capabilities.

It is, accordingly, the general object of the invention to provide an economical method of determining isotopic concentrations.

It is a further object to provide an apparatus for carrying out this method.

It is a more particular object to provide a method and apparatus for determining concentrations of the isotopes of the actinide elements.

Other objects will appear as the description proceeds.

I have found that isotopic concentrations can be determined by passing the specially controlled emission spectrum of an isotopic mixture of two isotopes through a cooled, xenon-filled, hollow-cathode discharge tube in which the cathode discharge surface is composed at least predominantly of one of the isotopes of the mixture. The absorption by the ground state atoms of the isotope in the discharge tube modify the spectrum sufficiently that the concentration of either isotope in the mixture can be sensed by any one of a number of readily available, comparatively cheap, sensing means.

The spectrum of most elements as resolved by ordinary spectrographs of low or medium resolving power is composed of a large number of lines, or bands of light of different wave-lengths. Actually these lines are groups of closely spaced lines of different intensities, which are due to the presence of different isotopes of the element in question. These may be differentiated by emission spectrographs of high resolving power, but in the less sophisticated instruments these closely spaced lines appear as single spectral lines which may be referred to as "line-clusters."

I need not sort out the individual isotopic lines which I am interested in, but need only sort out a line-cluster in which they appear. My invention includes means for modifying the intensity of a given line-cluster in a manner dependent on the isotopic concentrations in the element responsible for the line-cluster. The result is that I accomplish the same end that is accomplished by a spectograph of high resolving power by using an inexpensive, low-power instrument to sort out the line-cluster I have selected. In some instances a filter of tinted glass may be sufficient to carry out the line-cluster sorting function, which further reduces the cost of my apparatus and method.

A line-cluster sorter eliminates from the spectrum of the element concerned all but one line-cluster, the intensity of which is a function of the concentrations of the individual isotopes of the mixture as modified by the absorption tube. The modification will be large if the concentration of the absorbed isotope in the mixture is large, and small if the concentration is small; a linear relationship of concentration to light intensity applies.

Many means for sensing the intensity of line-clusters may be used; photographic plates and photocells of the photoconductive, photovoltaic and photomultiplier types are all applicable. I have had very good results with a photomultiplier type of sensor, the electrical output of which is amplified, rectified and fed into a moving-pen, moving-paper type of recorder. This is the preferred embodiment of my invention although, of course, the wide choice now available in this field makes many alternative arrangements attractive as well.

Reference is made to the drawings, FIG. 1 of which is a block diagram of the apparatus of my invention together with two specific examples of readout equipment;

FIG. 2 is a diagrammatic sketch showing spectrum emission tube gas control apparatus;

FIG. 3 is a diagrammatic sketch showing coolant circulation apparatus for the same spectrum emission tubes;

FIG. 4 is a diagrammatic sketch showing electrical apparatus for the same spectrum emmission tubes;

FIG. 5 is a longitudinal section view of the absorption tube;

FIG. 6 is a cross section view of the same absorption tube taken along 6—6 of FIG. 5;

FIG. 7 is a graph showing the linear relationship between percent transmittance and isotopic concentration using $U^{238}$ as a reference isotope; and FIG. 8 is a graph similar to that in FIG. 7 except that a $U^{235}$ reference isotope was used.

An absorber 20 in FIG. 1 is best shown in detail in FIGS. 5 and 6 as an absorption tube which is to some extent conventional in the art except for the modifications which are a part of this invention. A glass housing 22 has open ends covered with glass windows 24 and 25 suitably sealed by seals 26 and 27. A copper cathode block 28 is inserted through a neck 30 into the housing 22 and is suitably sealed by a neck seal 32. The cathode block 28 is positioned by an appropriately indexed collar 34 attached thereto. Internal coolant channel 36, in the cathode block 28 having inlet 38 and outlet 39, provides the cooling which I have found to be essential for accuracy and precision in this method of analysis.

In the cathode block 28, a tubular cathode 40 is positioned in an axially aligned hole 42. The inner surface 44 of this tubular cathode 40 is a cathode discharge surface which is composed of at least a major portion of one isotope of the element to be analyzed. For clarity this isotope will be called the "reference isotope." I have found a tubular cathode having a length of one and a half inches, and an inside diameter of one quarter inch to be entirely satisfactory.

Anode rings 46 and 47 suspended from support rods 48 and 49 are axially aligned with the tubular cathode 40 and are positioned so as to attract electrons from both ends of the tubular cathode thereby creating an elongated, symmetrical zone within the tubular cathode during hollow-cathode discharge operation. Discharge is carried out using a heavy rare gas such as xenon which is introduced into the housing 22 through gas inlet 50. After sweeping through the interior of the housing the xenon carries undesirable ions out of the housing through gas outlet 51, the gas inlet and outlet being connected to a suitable vacuum system such as is commonly used in the art to maintain a pressure of about ½ mm. Hg inside the housing 22.

Anode leads 52 and 53 and cathode lead 54 are connected to a conventional D.C. power supply which will provide about 300 volts at 100 ma. for the hollow-cathode discharge obtained with this apparatus.

I have found that this apparatus using the heavy rare gas xenon will successfully sputter a cloud of heavy atoms of an element such as uranium into the interior of the tubular cathode whereas conventional absorption sources have failed. Flame absorption sources have failed to analyze uranium for isotopic concentration due to lack of sufficient energy as well as to the difficulty in maintaining uranium in an uncombined atomic state in a flame.

The reference isotope is also used as the major component of the element in a reference emitter 60 as shown in FIG. 1. This together with a sample emitter 62 are used as the emission spectrum source, either emitter providing the spectrum depending on the position of the selector 64 which may be a simple mirror. This permits a quick shift in spectrum source without changing emission discharge conditions such as would occur if it were necessary to dismantle an emitter to substitute a second source. The schematically indicated emitters 60 and 62 are typical water-cooled hollow-cathode discharge emission tubes such as are commonly referred to in the art as Schuller-Gollnow tubes which are described in Z. Physik 93, 611 (1935). However, I have found that certain conditions must be met, and accompanying apparatus modifications must be made in order to obtain the analyses of isotopes of heavy elements, such as uranium containing $U^{235}$ and $U^{238}$.

As shown in FIG. 2 it is essential that both emitters 60 and 62 be connected with one rare gas pressure and circulation controller 66. With a gas pressure of about 1 mm. Hg, sufficient rare gas, preferably krypton, flows through the inlet ports 67 and 68 to sweep away unwanted or excess atoms through the outlet ports 69 and 70. Suitable cold traps, flow controllers, diffusion pumps and pressure regulator, all conventional in the art, may be provided as a part of the controller 66.

As shown in FIG. 3 the emitters 60 and 62 are water-cooled by a controlled flow delivered equally to each emitter by a flow controller 72 through coolant lines 74 and 75.

The emitters 60 and 62 as shown in FIG. 4 have a mutually shared D.C. power source 76 which supplies about 300 volts at 20 ma. The current flows from a reference emitter anode 78 which is, as indicated schematically, a ring-type electrode, to a reference emitter cathode 79, then to a sample emitter anode 80 and out through a sample emitter cathode 81. By connecting both emitters in series with the same power source 76, identical hollow-cathode discharge conditions are maintained.

The modifications shown in FIGS. 2, 3 and 4 all work together to give comparable spectral line widths, and comparable emission conditions for the photons operated on by the absorber 20.

Light emitted by emitters 60 and 62 as shown in FIG. 1 passes through the absorber 20 and into line-sorter 82 which eliminates all but the spectral line, or line-cluster sought. This line-cluster is used to activate automatic electronic sensing equipment in a modulation sensor 84, which is capable of giving an output 85 calibrated in percent concentration of either isotope present. Since some emission spectral line intensity would arise from the hollow-cathode discharge conditions in the absorber 20, a mechanical modulator 86 is introduced into the light path ahead of the absorber 20 to give the emitter spectrum a frequency which may be sensed by tuning the modulation sensor 84 to the same frequency, thereby eliminating the unmodulated absorber-initiated emission spectrum. Such modulators are conventional in this art.

Several other means for reading out the modulation sensor signal are also shown schematically in FIG. 1. A detector 88 receives the light from the spectral line passed on by the line-sorter 82' and converts the light intensity into an electrical output with suitable amplification and rectification to feed an index signal 89 into a recorder 90. If the signal 89 is based on the spectral line intensity $I_o$ from a pure isotope reference emitter 60 without the absorber 20 operating, all of the reference isotope radiation is represented and may be indicated by setting the recorder 90 to read a full-scale 100 percent. With the absorber 20 operating, essentially all of the intensity $I_o$ will be absorbed and the corresponding recorder scale may be set to read zero percent. Flipping the selector 64 passes light from the sample emitter 62 through the operating absorber 20 which passes only the light intensity $I_s$ representing the non-reference isotope concentration in the sample emitter 62. If the emission conditions in the sample emitter are essentially the same as in the reference emitter $I_s$ may be fed as an analysis signal 92 into the recorder 90, and the recorder reading may be interpreted as present non-reference isotope concentration in the sample directly. For example, if the reference isotope in both the absorber 20 and the reference emitter 60 is $U^{238}$, then the recorder 90 will read percent $U^{235}$. Such an analysis may be accomplished in a matter of seconds.

Another schematically shown means for reading out the modulation sensor signal is shown in FIG. 1 in which a detector 94 similar to detector 88 receives light from the spectral line passed on by the line-sorter 82''. An output signal 96, again representing $I_o$, is fed into a subtractor 98 which stores a charge proportional to $I_o$. $I_o$ is switched out and an analysis signal 99 representing $I_s$ is switched in, subtracting a charge proportional to $I_s$. The remaining charge in the subtractor 98 then is available as a readout signal 100 which is proportional to the reference isotope concentration.

Sample analysis will be relatively simple if reasonably pure reference isotopes are used in both the absorber 20 and the reference emitter. However, accurate analyses may be made with a less than pure reference isotope by applying suitable correction factors to the analytical results. Such corrections are within the ability of one skilled in the art and do not form a part of this invention.

The optical path from the emitters 60 and 62 to the modulation sensor 84 may be equipped with suitable condensing and focusing lenses commonly used in this art in order to increase the amount of light transmitted through the apparatus.

I have found that the use of a different rare gas in the emitters 60 and 62 from that used in the absorber 20 has given a gas emission spectrum which is not subject to absorption in the absorber, thereby eliminating any variation in spectral line interference due to gas excitation. This makes it possible to use a less sensitive, less selective and less expensive sensing instrument since a broader segment of the spectrum may be included with the sought-for spectral line cluster without concern about extraneous effects due to spectral line variation caused by the gases used. Specifically, for uranium isotope analysis, the combination of krypton in the emitters 60 and 62 with xenon in the absorber 20 gives a heavy gas for sputtering in the absorber and at the same time makes it possible to have well-defined absorption and emission spectra without interference.

An unexpected advantage in having the sample at the emitter rather than at the absorber for isotopic analysis of uranium is that an unusually high degree of accuracy and precision has resulted. The best explanation for this appears to lie in the phenomena associated with the laws of light absorption which are such that the proportion of light absorbed by a transparent medium is independent of the intensity of the incident light, and that each successive unit layer of such a medium absorbs an equal fraction of the light passing through it.

This accuracy and precision, then, has resulted in part from placing the sample at the emitter where it is subject only to variation in intensity of emission. This variation is of no consequence in my method and apparatus since the proportion of light absorbed is independent of emission intensity.

Table I shows an example of the accuracy obtained. The analyses of several types of samples for $U^{238}$ concentration are compared with results obtained from a mass spectrograph. The column headed "Rel. Dev., percent" shows the percent of deviation from the mass spectrographic analysis. This assumes that the mass spectrographic analysis is more accurate.

TABLE I.—ACCURACY

[Uranium-238 Atom percent]

| Atomic Absorption | Mass Spec. | Dev., Atom percent | Rel. Dev., percent |
|---|---|---|---|
| 78.8 | 79.7 | 1.10 | 1.4 |
| 60.3 | 59.9 | 0.40 | 0.7 |
| 51.5 | 50.4 | 1.10 | 2.2 |
| 40.6 | 39.5 | 0.90 | 2.3 |
| 19.6 | 19.1 | 0.50 | 2.6 |
| 5.60 | 5.59 | 0.01 | 0.2 |
| 49.8 | 50.4 | 0.60 | 1.2 |
| 2.41 | 2.38 | 0.03 | 1.3 |
| 0.58 | 0.60 | 0.02 | 3.3 |

Table II shows the precision obtained by this method and apparatus. Calculations are according to the Standard Error Mean Method. The results are comparable to the precision normally expected from a mass spectrograph.

TABLE II.—PRECISION

| Tracing No. | Atom percent U-238 | Dev. from Avg. Atom percent (d) | (Dev.)² |
|---|---|---|---|
| 1 | 51.5 | 0.0 | 0.00 |
| 2 | 51.5 | 0.0 | 0.00 |
| 3 | 51.5 | 0.0 | 0.00 |
| 4 | 51.8 | 0.3 | 0.09 |
| 5 | 51.5 | 0.0 | 0.00 |
| 6 | 50.5 | 1.0 | 1.00 |
| 7 | 52.0 | 0.5 | 0.25 |
| 8 | 52.0 | 0.5 | 0.25 |
| 9 | 51.0 | 0.5 | 0.25 |
| 10 | 51.0 | 0.5 | 0.25 |
| 11 | 51.5 | 0.0 | 0.00 |
| 12(n) | 52.1 | 0.6 | 0.36 |
| Average | 51.5 | | 2.45 |

Std. Error=$(\Sigma d^2/n(n-1))^{1/2}$=51.5±0.1

Accurate analyses for low concentrations of an isotope are best obtained by making that isotope the reference isotope, determining that isotopic concentration accurately and finding the concentration of the remaining isotope by difference. This is illustrated graphically in FIGS. 7 and 8. In FIG. 7 the reference isotope is $U^{238}$, that is, both the absorber and reference emitter contain high proportions of $U^{238}$ while in FIG. 8 both the absorber and reference emitter contain high proportions of $U^{235}$ as the reference isotope. The graph in FIG. 7 is based on an absorber (tubular cathode) having 99.8% $U^{238}$ and 0.2% $U^{235}$, while the graph in FIG. 8 is based on an absorber (tubular cathode) having 95% $U^{235}$ and 5% $U^{238}$.

The percent transmittance in these graphs was obtained for a series of standards, by using the relationship $I/I_0 \times 100$=percent transmittance. $I_0$ is the intensity of the isotopic spectral line-cluster for a standard sample without absorption. $I$ is the intensity of the same line-cluster for the standard sample with the absorber operating. If the reference emitter is a pure isotope, $I_0$ may be equated to 100, and $I$ for unknown samples containing both isotopes may be interpreted from a graph directly in percent concentration for both isotopes.

The graph in FIGS. 7 and 8 show that this method does not require pure reference isotopes. For a particular tubular cathode composition, a relationship such as shown in the graphs may be established experimentally. This relationship will be linear and will always remain the same for a given tubular cathode composition. The "Experimental Curve" in FIG. 7 differs in slope from the "Theoretical Curve" because the tubular cathode was not pure $U^{238}$.

A distinct advantage of this invention is that any form of sample may be analyzed whether oxide, nitrate, metal, solution, etc., and it is not required that the reference emitter 60 and the sample emitter 62 contain like forms.

When less than pure isotopes are used, or when the sample is a different form of compound or mixture from that used in the reference emitter one can expect different intensities in the spectra. This is easily handled by adjusting the absorber discharge conditions to give a predetermined acceptable value for percent transmittance with the reference emitter, then determining percent transmittance for the sample emitter and reading the corresponding percent isotopic concentration from a graph such as is shown in either FIG. 7 or FIG. 8.

The tubular cathode may be natural uranium which is relatively inexpensive and has about 99.3% $U^{238}$, 0.7% $U^{235}$ and traces of $U^{234}$ and $U^{236}$. This method of analysis may be extended to include the isotopes $U^{234}$ and $U^{236}$ when they are present in larger quantities by substitution of suitable tubular cathodes and reference emitters in successive analyses. One would known from the history of a sample whether to expect significant amounts of $U^{234}$ and $U^{236}$. Isotopic analysis of other heavy-atom elements such as other actinides will be possible by this method.

The apparatus and method of this invention make it possible to obtain isotopic analyses of uranium to be used for nuclear reactor fuel by the use of relatively inexpensive instruments with accuracy and precision usually thought to be possible only with an expensive mass spectrometer.

It is to be understood that the invention is not to be limited to the details given herein, but that it may be modified within the scope of the appended claims.

The embodiments of the invention in which an exclusive property or privilege is claimed are defined as follows:

1. An apparatus for the determination of isotopic concentration in a mixture of two isotopes of an element comprising:

(a) an absorption tube containing an externally cooled tubular cathode, said cathode having at least an inner surface consisting essentially of a reference isotope of said element;

(b) means for establishing a hollow-cathode discharge within said absorption tube using ions of a heavy rare gas, said ions being capable of sputtering a cloud of ground state atoms of the reference isotope from the inner surface of said tubular cathode;

(c) a pair of spectrum emission sources one of which is a reference emitter and the other a sample emitter, the sample having an undefined mixture of said two isotopes, and said reference emitter having a known composition, said composition being essentially of the same reference isotope as that used in the inner surface of the tubular cathode, said sources each emitting an intensity of photons from each isotope linearly dependent on the proportion of isotope present;

(d) means for successively directing photons from said reference emitter and said sample emitter through the axis of said tubular cathode wherein the ground state atoms of the reference isotope absorb resonant photons emitted by the reference isotope in said sources when said tubular cathode is operating;

(e) sorter means for isolating a single spectral line characteristic of said element, said means positioned to receive photons transmitted from said emission sources through said tubular cathode;

(f) means positioned between said sources and said absorption tube for modulating the flow of photons being transmitted; and (g) sensor means for relating the intensities of said spectral line to isotope concentration, said means being sensitive only to the modulated flow of photons.

2. The apparatus of claim 1 in which the absorption tube contains a pair of ring-shaped anodes axially aligned along the axis of said tubular cathode, said anodes being positioned adjacent opposite ends of said tubular cathode such that electrons are attracted from both ends of said tubular cathode to said anodes.

3. The apparatus of claim 2 in which said emission sources are externally cooled, hollow-cathode discharge tubes electrically connected in series having a common gas circulation system, said gas being a heavy rare gas other than that used in said absorption tube.

4. The apparatus of claim 3 in which said sensor means comprises a photomultiplier type of detector and a recorder connected thereto, said recorder being set at a scale reading proportional to the intensity of the spectral line from the reference isotope in the reference emitter without said tubular cathode operating, the recorder reading in response to the intensity of the spectral line from the sample emitter with said tubular cathode in operation being directly related to the concentration of the non-reference isotope in the sample, said reference emitter and said sample emitter containing like forms of said element.

5. The apparatus of claim 3 in which said sensor means comprises a photomultiplier type of detector and a subtractor unit, the ouput signal of which is directly proportional to the concentration of reference isotope in said sample, said reference emitter and said sample emitter containing like forms of said element.

6. A method of determining isotopic concentrations in a mixture of $U^{235}$ and $U^{238}$ in which $U^{235}$ predominates, comprising:

(a) simultaneously producing emission spectra from a reference emitter containing predominantly $U^{238}$ as a reference isotope, and also from a sample emitter containing said mixture of isotopes, said spectra being produced under comparable hollow-cathode discharge conditions using krypton;

(b) modulating the reference emitter spectrum to impart a given frequency to the transmitted light;

(c) passing the modulated spectrum through a non-operating absorption tube into a line-sorter;

(d) sorting out a spectral line characteristic of uranium;

(e) sensing the intensity of the spectral line with a modulating sensor tuned to the given frequency;

(f) activating the absorption tube in which a cloud of ground state atoms of uranium are sputtered from the interior of a tubular cathode, said cathode comprising uranium metal having a predominant proportion of $U^{238}$ as the reference isotope, resonant photons in the emission spectrum from the reference isotope being largely absorbed in said cloud, the sputtering being accomplished by hollow-cathode discharge conditions using xenon;

(g) sensing the as-absorbed intensity of the spectral line;

(h) adjusting the absorption tube current to give a predetermined level of transmittance for said spectral line;

(i) substituting the sample emitter spectrum for the reference emitter spectrum;

(j) sensing the as-absorbed intensity of the spectral line from the sample emitter spectrum, said intensity being primarily due to unabsorbed photons emitted by $U^{235}$;

(k) shutting off the absorption tube discharge; and (l) sensing the intensity of the unabsorbed spectral line from the sample emitter thereby obtaining a transmittance value dependent on the concentration of $U^{234}$, the difference in as-absorbed and unabsorbed intensities being proportional to the $U^{238}$ concentration in the mixture.

References Cited

A. Walsh, "Atomic Absorption Spectroscopy," Procedings of Xth Colloquium Spectroscopium Internationale, pp. 127–142, Spartan Books, Washington, D.C. (1962).

JEWELL H. PEDERSEN, *Primary Examiner.*

B. J. LACOMIS, *Assistant Examiner.*